April 7, 1953 R. C. REASONER 2,633,866
AUTOMATIC SHUTOFF VALVE
Filed Dec. 9, 1949 2 SHEETS—SHEET 1

INVENTOR
RICHARD C. REASONER
ATTORNEYS

April 7, 1953  R. C. REASONER  2,633,866
AUTOMATIC SHUTOFF VALVE
Filed Dec. 9, 1949  2 SHEETS—SHEET 2
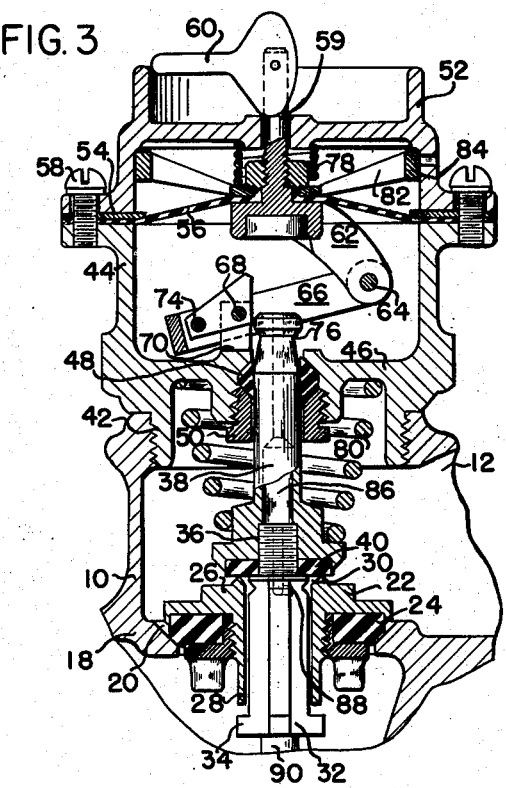
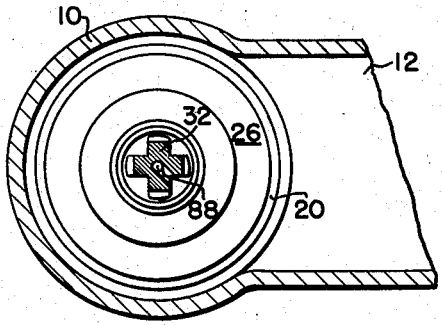
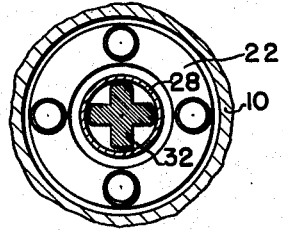
INVENTOR
RICHARD C. REASONER
by Toulmin & Toulmin
ATTORNEYS Patented Apr. 7, 1953

2,633,866

UNITED STATES PATENT OFFICE 2,633,866

AUTOMATIC SHUTOFF VALVE

Richard C. Reasoner, Dayton, Ohio, assignor to Buckeye Iron & Brass Works, Dayton, Ohio, a corporation of Ohio Application December 9, 1949, Serial No. 132,120

4 Claims. (Cl. 137—463)

This invention relates to valves, and particularly to automatic shut-off valves for controlling the flow of gasoline and similar fluids, especially when they are being transferred from a tank truck or tank car into an underground tank or the like.

In the filling of underground tanks and the like, one of the difficulties is an accurate determination of when the tank is filled to the proper level so that the supply of fluid thereto can be halted at the proper time. A particularly desirable manner of accomplishing this, is to have an automatic arrangement which will automatically close a shut-off valve at the proper time and thereby prevent running over of the tank. A number of different arrangements have been devised for accomplishing this, but heretofore, all of the said arrangements have had certain disadvantages which detract from their utility. For example, some of these valves did not operate to shut off the fluid flow until the tank being filled was completely full, whereby considerable amount of spillage obtained when the supply line was disconnected from the tank.

In other cases, the valves were not sufficiently responsive to be dependable, and this, of course, led to the running over of the tank being filled.

The particular object of the present invention, is the provision of a valve of the nature described, which will automatically interrupt the flow of fluid through the valve when the tank being filled reaches a predetermined level.

Another object is the provision of a valve of the character described, which is very certain in operation, thereby eliminating a number of the difficulties and disadvantages encountered in connection with valves of the prior art.

It is also an object of this invention to provide an automatic cut-off valve of the type referred to, which is relatively inexpensive to manufacture, and which can readily be repaired and serviced if necessary.

It is also an object of this invention to provide a valve arrangement of the nature described, which has a large flow passage therethrough for permitting rapid flow of fluid, but which is easy to operate manually.

These and other objects and advantages will become more apparent upon reference to the following description taken in connection with the accompanying drawings, in which:

Figure 3 is a view similar to Figure 2, but shows the latch for the valve member in its released position and the valve member closed.

Figure 5 is a plan section indicated by line 5—5 on Figure 2 and showing the configuration of the stem forming a part of the valve member and the arrangement of a fluid passage formed therein, and Figure 6 is a sectional view indicated by line 6—6 on Figure 2 and looking upward toward the bottom of the valve member.

Figure 1:
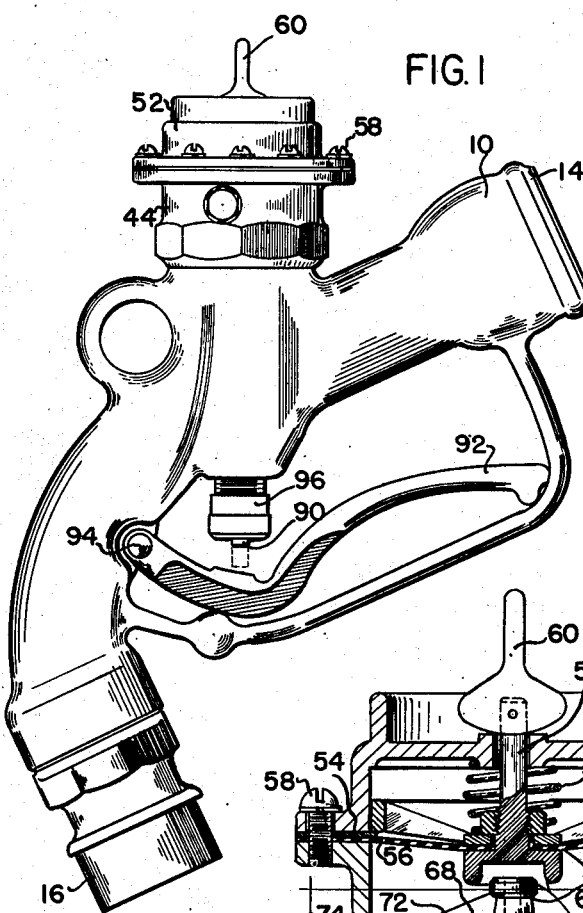
Figure 1 is a side elevation of a valve constructed according to my invention.
Figure 2:
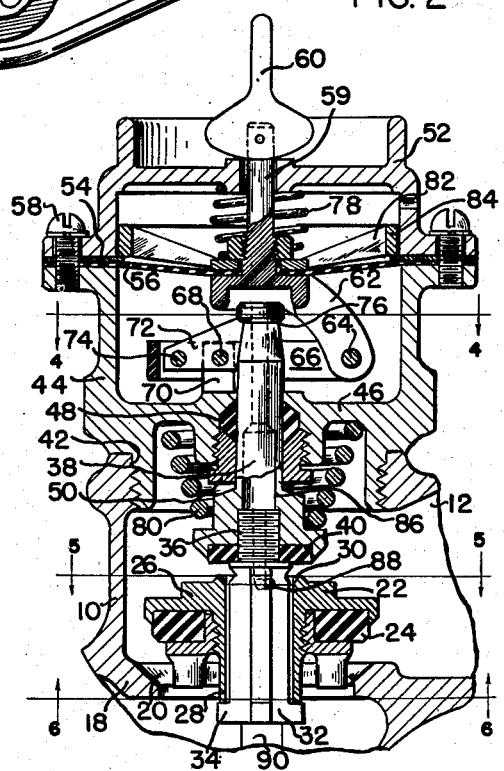
Figure 2 is a vertical section through the valve looking in the same direction as in Figure 1 and showing the valve with the valve member latched in an open position.
Figure 4:
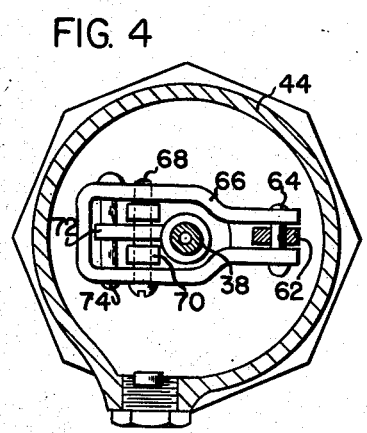
Figure 4 is a transverse section indicated by line 4—4 on Figure 2 and showing the construction and arrangement of the latch mechanism.

Referring to the drawings somewhat more in detail, the valve shown therein comprises a main body part 10 having a flow passage extending therethrough, as indicated at 12 in Figures 2 and 3. Valve body 10 is adapted for connection at its end 14 to a supply pipe or conduit leading from a source of fluid which is to be controlled by the valve. The other end of valve body 10, as at 16, is adapted for connection with the fill pipe of a tank or the like, as for example, by means of a quick detachable coupling of any suitable and well known nature.

Disposed within flow passage 12 and forming a part of body 10, is a partition 18 bored out to form a valve seat 20. Reciprocably mounted on the inlet side of seat 20, is a valve member 22 comprising a disc of resilient material 24 for engaging the aforementioned seat 20. Valve member 22 comprises a hollow carrier member 26 which includes a depending sleeve part 28. The upper end of carrier member 26 is formed with an annular valve seat 30, which is of substantially smaller diameter than valve seat 20.

Extending through the hollow interior of carrier member 26, is a fluted valve stem 32 which has its lowermost end outwardly flanged as at 34 for abutting the lower end of sleeve part 28 so that upward movement of stem 32 will lift valve member 22 from its seat.

Stem 32 is threaded, as at 36, to another stem part 38, and a valve disc 40 is clamped between the said stem parts and is adapted for engaging valve seat 30. It will be seen that when both valve members are seated on their respective seats, the flow channel 12 will be interrupted. It will also be seen that stem part 32 and valve disc 40 have a certain amount of freedom of axial movement relative to valve member 22, and this is of importance in obtaining ease of operation of the valve, because when it is to be opened, the smaller valve member, as represented by valve disc 40, will open and relieve the pressure in flow channel 12 before valve member 22 is opened.

Valve body 10 is bored and threaded, as at 42, and mounted in the said bore is an auxiliary part 44 which comprises a partition 46 for reciprocably receiving valve stem 38. Packing means 48, including a gland 50, may be provided for preventing leakage along stem 38.

Mounted on the upper end of auxiliary body part 44, is a vented closure member 52 which serves to clamp a washer 54 and the peripheral rim part of a diaphragm 56 against the upper surface of auxiliary body part 44. Screws 58 may be advantageously employed for securing body part 44 and closure member 52 together.

A rod 59 is secured to the center of diaphragm 56 and extends upwardly through the top of closure member 52 for receiving a cam 60, the purpose of which will be explained hereinafter. Immediately below the diaphragm 56, rod 59 comprises an arcuate arm 62 having a pivot pin 64. Engaging pivot pin 64 is a yoke 66 that passes around stem part 38 and is pivoted, as by pivot screw 68, to a pair of upstanding lugs 70 formed on the upper surface of partition 46 adjacent stem part 38.

Also pivotally mounted on pivot screw 68, is a latch member 72. A pin or rivet 74 is provided, which secures the latch member to the yoke, so that they move as a unit about pivot screw 68.

The end of latch member 72, adjacent stem part 38, is adapted for being received in notch 76 formed adjacent the upper end of the said stem part. The yoke and latch member are normally urged for their notched engaging position, by a spring 78 bearing between the upper surface of diaphragm 56 and the lower surface of closure member 52. It will be evident that the chamber beneath the diaphragm is closed, and that introduction therein of a predetermined amount of pressure, will cause upward movement of diaphragm 56, rod 59, and arm 62, thereby pivoting yoke 66 and latch member 72 about pivot screw 68 into position to release stem part 38.

Bearing between the lower surface of partition 46 and an upwardly facing shoulder on stem part 38, is a compression spring 80, so that when stem part 38 is released, as described above, the said spring immediately forces the valve members into engagement with their respective seats, thereby interrupting flow channel 12.

Turning again to diaphragm 56, this member is backed up by a spider 82 which is secured to rod part 59 and is free for reciprocal movement within closure member 52. Spider member 82 has an outer rim part 84 adapted for engagement with the inwardly projecting portion of the previously described washer 54. Washer 54 thus serves as a stop for the said spider member, rod and diaphragm.

For supplying pressure fluid to the compartment beneath diaphragm 56, stem parts 32 and 38 have a flow passage 86 therein which opens out the top of stem part 38, and out the side of stem part 32 beneath valve disc 40, as at 88. It will be evident that the pressure standing in the chamber beneath the diaphragm 56, is the same as that in flow channel 12, and that whenever the valve members are open, if this pressure reaches the valve which will release latch member 72, the said valve members will quickly and automatically close.

For actuating the valve members into their open position, stem part 32 has a plunger portion 90 extending downwardly therefrom and out the bottom of valve body 10, where it is adapted for engagement by hand-lever 92 pivoted to body 10, as at 94. Suitable packing means, as at 96, are preferably provided about plunger 90, to prevent leakage of fluid from the valve.

In operation, end 16 of valve body 10, is connected with the fill pipe of a tank to be filled. Thereafter, lever 92 is actuated to move the valve members to their Figure 2 position, at which time latch member 72 will fall into engagement with undercut 76 on stem part 38, thus latching the valve members in their opened position and permitting fluid flow through flow channel 12 and into the tank being filled.

During normal filling operations, the compartment beneath diaphragm 56 is under little or no pressure, but as the tank begins to fill up, a back pressure is developed, which is conveyed through passage 86 into the said compartment and acts to urge diaphragm 56 upwardly, as previously described, and thereby to withdraw latch member 72 from engagement with stem part 38. When the pressure acting on diaphragm 56 is high enough completely to release latch member 72, spring 80 becomes effective for quickly closing the valve members and interrupting fluid flow through flow channel 12.

It is preferable to provide the lower end of the aforementioned fill pipe with some type of float valve that will close off the fill pipe when the fluid in the tank reaches a predetermined level. By an arrangement of this nature, a rather rapid increase in the pressure of the fluid within the flow channel is obtained, and this brings about the tripping of the valve into its closed position before the fill pipe leading to the tank is completely full. In this manner, the valve can be disconnected from the fill pipe with substantially no spillage of fluid.

It will be evident that as soon as the valve 10 is disconnected from the fill pipe, the pressure acting on diaphragm 56 will be relieved, and latch member 72 will return to its effective position.

Should it be desired to operate the valve as the usual type manual valve, such as is employed in filling stations on gasoline dispensing pumps, the cam 60 can be availed of for holding the latch mechanism in ineffective position, thereby leaving the valve members completely under the control of spring 80 and lever 92. It will also be evident that cam 60 can be availed of at any time for manually tripping the valve closed in the event that it should fail to operate automatically for any reason whatsoever. The valve mechanism, according to this invention, is relatively simple to manufacture and assemble, has a long service life, and is easy to repair at any time.

This application is related in subject matter to the co-pending United States application in the name of Othello M. Hillman, Serial No. 132,155, filed December 9, 1949.

It will be understood that this invention is susceptible to modification in order to adapt it to different usages and conditions, and, accordingly, it is desired to comprehend such modifications within this invention as may fall within the scope of the appended claims.

I claim:

1. In an automatic shut-off valve having a valve body with a flow passage therethrough; a valve member in said body normally urged toward a passage interrupting position but movable into a passage establishing position, a stem on said valve member, a compartment on said body opening outwardly therefrom and into which said stem sealingly extends, a notch in the stem in the compartment, a latch member pivoted in said compartment and engageable with the notch in said stem when the valve member is moved into its passage establishing position, a diaphragm mounted over the open side of said compartment, a closure member mounted over the end of said compartment clamping the periphery of said diaphragm in sealing engagement with said compartment, a backing member for and arranged above said diaphragm and substantially coextensive with the open side of said compartment and reciprocable by the movement of said diaphragm, stop means adjacent the periphery of said backing member for arresting downward movement of said backing member and said diaphragm connected therewith, a rod extending through said closure member and fastened to said backing member and to the center part of said diaphragm and including an extension connected with said latch member whereby movement of said rod will disengage said latch member from said stem, a channel extending through said stem opening at its upper end through the top of the stem and at its lower end on the upstream side of the valve member for connecting said compartment with said flow passage, and resilient means bearing between said closure member and diaphragm for urging the latter together with said rod toward position to place said latch member in effective position.

2. In a valve having a valve body with a flow passage; a seat in said passage, a first valve member for engagement with the upstream side of said seat having an axial bore therethrough with a seat formed therearound at one end, a second valve member movable against the seat around said bore on the upstream side thereof having a lost motion connection with said first valve member, said second valve member having a stem, an outwardly opening compartment on said valve body into which said stem sealingly extends, a latch member pivoted in said compartment and urged toward engagement with said stem when the valve members are in their open position, spring means bearing on said second valve member for urging it toward its seat and for urging said first valve member toward its seat, a diaphragm closing the open side of said compartment and connected with said latch member so flexing of the diaphragm will withdraw the latch member from engagement with the stem, a backing member for and arranged above said diaphragm and substantially coextensive with the open side of said compartment and reciprocable by the movement of said diaphragm, stop means adjacent the periphery of said backing member for arresting downward movement of said backing member and said diaphragm connected therewith and a channel extending through said stem for communicating the space between said valve members with said compartment.

3. In a valve; a valve body having a flow passage with a valve seat, an annular valve member for engagement with said seat, a valve disk for engagement with said valve member for controlling the opening through the annular valve member and having a stem extending through the valve member and out both sides of said body, said stem having a lost motion connection with said valve member, a spring acting on said valve disk urging it toward said valve member and said valve member toward its seat, a lever pivoted on one side of said body for engaging said stem to urge said valve disk and valve member toward their open position, a latch member pivoted on the other side of said body for engagement with said stem when said valve disk and valve member are in their open position, an outwardly opening compartment surrounding said latch member and sealingly surrounding the adjacent part of said stem, a diaphragm closing the open side of said compartment, a closure member clamping the periphery of said diaphragm over the open side of said compartment, a rod slidable in said closure member and secured to said diaphragm and having a part connected with said latch member so actuation of said rod from externally of said compartment or flexing of said diaphragm will move said latch member to ineffective position, a backing member for and arranged above said diaphragm and substantially coextensive with the open side of said compartment and reciprocable by the movement of said diaphragm, stop means adjacent the periphery of said backing member for arresting downward movement of said backing member and said diaphragm connected therewith and a channel extending through said stem and communicating the space below said valve disk with said compartment.

4. In a valve; a valve body having a flow passage with a valve seat, an annular valve member for engagement with said seat, a valve disk for engagement with said valve member for controlling the opening through the annular valve member and having a stem extending through the valve member and out both sides of said body, said stem having a lost motion connection with said valve member, a spring acting on said valve disk urging it toward said valve member and said valve member toward its seat, a lever pivoted on one side of said body for engaging said stem to urge said valve disk and valve member toward their open position, a latch member pivoted on the other side of said body for engagement with said stem when said valve disk and valve member are in their open position, an outwardly opening compartment surrounding said latch member and sealingly surrounding the adjacent part of said stem, a diaphragm closing the open side of said compartment, a closure member clamping the periphery of said diaphragm over the open side of said compartment, a rod slidable in said closure member and secured to said diaphragm and having a part connected with said latch member so actuation of said rod from externally of said compartment or flexing of said diaphragm will move said latch member to ineffective position, a spring acting between said closure member and diaphragm for urging the latter toward position to make said latch member effective, a backing member for and arranged above said diaphragm and substantially coextensive with the open side of said compartment and reciprocable by the movement of said diaphragm, stop means adjacent the periphery of said backing member for arresting downward movement of said backing member and said diaphragm connected therewith and a channel extending through said stem and communicating the space below said valve disk with said compartment.

RICHARD C. REASONER.

REFERENCES CITED

The following references are of record in the file of this patent:

UNITED STATES PATENTS

| Number | Name | Date |
| --- | --- | --- |
| 1,550,738 | Payne | Aug. 25, 1925 |
| 1,890,847 | Flory | Dec. 12, 1932 |
| 2,320,033 | Davis | May 25, 1943 |
| 2,330,616 | Parker | Sept. 28, 1943 |
| 2,357,657 | Jensen | Sept. 5, 1944 |
| 2,363,123 | Franck | Nov. 21, 1944 |
| 2,380,608 | Palm | July 31, 1945 |